United States Patent
Andre et al.

(10) Patent No.: US 12,217,029 B1
(45) Date of Patent: Feb. 4, 2025

(54) GENERATING INTERFACING SOURCE CODE

(71) Applicant: X Development LLC, Mountain View, CA (US)

(72) Inventors: David Andre, San Francisco, CA (US); Nisarg Vyas, Gujarat (IN); Salil Pradhan, San Jose, CA (US); Rebecca Radkoff, San Francisco, CA (US); Ryan Butterfoss, San Francisco, CA (US); Falak Shah, Gujarat (IN); Jayendra Parmar, Gujrat (IN)

(73) Assignee: GOOGLE LLC, Mountain View, CA (US)

( * ) Notice: Subject to any disclaimer, the term of this patent is extended or adjusted under 35 U.S.C. 154(b) by 218 days.

(21) Appl. No.: 17/889,567

(22) Filed: Aug. 17, 2022

Related U.S. Application Data (60) Provisional application No. 63/243,873, filed on Sep. 14, 2021.

(51) Int. Cl.
G06F 8/35 (2018.01)
G06F 9/54 (2006.01)

(52) U.S. Cl.
CPC . *G06F 8/35* (2013.01); *G06F 9/54* (2013.01)

(58) Field of Classification Search
CPC ................................... G06F 8/33; G06F 8/35
USPC ...................................................... 717/107
See application file for complete search history.

(56) References Cited

U.S. PATENT DOCUMENTS

| 8,458,651 | B2 * | 6/2013 | Kurian | G06F 8/76 |
| | | | | 717/137 |
| 8,745,581 | B2 | 6/2014 | Esbensen et al. | |
| 11,042,369 | B1 * | 6/2021 | Kimball | G06F 9/4843 |
| 11,288,063 | B2 * | 3/2022 | Abadi | G06F 8/36 |

(Continued)

FOREIGN PATENT DOCUMENTS

| CN | 116541071 A | * | 8/2023 | |
| WO | WO-2017134665 A1 | * | 8/2017 | G06F 16/951 |

OTHER PUBLICATIONS

Ellis et al., "DreamCoder: Growing generalizable, interpretable knowledge with wake-sleep Bayesian program learning" arXiv:2006.08381v1 [cs.AI], 22 pages, dated Jun. 15, 2020.

(Continued)

*Primary Examiner* — Francisco J Aponte
(74) *Attorney, Agent, or Firm* — Gray Ice Higdon (57) ABSTRACT

This specification is generally directed to techniques for generating interfacing source code between computing components based on natural language input. In various implementations, a natural language input that requests generation of interfacing source code to logically couple a first computing component with a second computing component may be processed to generate an interface request semantic embedding. The interface request semantic embedding may be processed based on one or more domain models associated with the first and second computing components to generate a pool(s) of candidate code snippets for logically coupling with first and second computing components. A plurality of candidate instances of interfacing source code may be generated between the first and second computing components. Each candidate software interface may include a different permutation of candidate code snippets from the pool(s) of candidate code snippets.

20 Claims, 6 Drawing Sheets

(56) References Cited

U.S. PATENT DOCUMENTS

| | | | |
|---|---|---|---|
| 11,487,522 B1* | 11/2022 | Singh | G06F 8/53 |
| 11,693,637 B1* | 7/2023 | Singh | G06F 8/436 |
| | | | 717/139 |
| 2015/0186193 A1* | 7/2015 | Jain | G06F 9/541 |
| | | | 719/328 |
| 2015/0242396 A1 | 8/2015 | Su | |
| 2017/0300563 A1* | 10/2017 | Kao | G06F 16/36 |
| 2018/0189039 A1* | 7/2018 | Hart | G06F 8/76 |
| 2019/0079754 A1* | 3/2019 | Makkar | G06N 5/022 |
| 2019/0295532 A1 | 9/2019 | Ammedick et al. | |
| 2019/0340284 A1* | 11/2019 | Kandukuri | G06F 16/24535 |
| 2020/0097261 A1* | 3/2020 | Smith | G06F 40/174 |
| 2020/0104102 A1* | 4/2020 | Brockschmidt | G06F 40/232 |
| 2020/0293291 A1* | 9/2020 | Guan | G06F 17/15 |
| 2021/0141863 A1* | 5/2021 | Wu | G06N 3/08 |
| 2022/0012019 A1* | 1/2022 | Wilson-Thomas | G06F 8/33 |
| 2022/0128980 A1* | 4/2022 | Ludwig | G06F 9/5027 |
| 2022/0156466 A1* | 5/2022 | Gill | G06F 40/30 |
| 2022/0206785 A1* | 6/2022 | Singh | G06F 8/51 |
| 2022/0236971 A1* | 7/2022 | Zhang | G06F 8/51 |
| 2023/0251834 A1* | 8/2023 | Tao | G06F 8/36 |
| | | | 717/106 |
| 2023/0350657 A1* | 11/2023 | Singh | G06N 3/045 |
| 2024/0143296 A1* | 5/2024 | Hasabnis | G06F 8/41 |

OTHER PUBLICATIONS

Trieth et al., "Deep Learning for Source Code Modeling and Generation: Models, Applications and Challenges" arXiv:2002.05442v1 [cs.SE], 37 pages, dated Feb. 13, 2020.

Allamanis et al., "SmartPaste: Learning to Adapt Source Code" arXiv:1705.07867v1 [cs.LG], 31 pages, dated May 22, 2017.

Portenier et al., "Smart, Deep Copy-Paste" arXiv:1903.06763v1 [cs.GR] 12 pages, dated Mar. 15, 2019.

Miltos Allamanis, "Understanding Source Code through Machine Learning to Create Smart Software Engineering Tools" University of Edinburgh. 97 pages, dated Mar. 13, 2016.

* cited by examiner

GENERATING INTERFACING SOURCE CODE

BACKGROUND

In computer programming it is common to logically couple computing components together using interfacing source code. This may be done for a variety of different reasons, including but not limited to data migration, cooperation and/or interoperation amongst otherwise incompatible computing components, mapping between objects and/or databases, and so forth. For instance, a thin layer of source code that is sometimes referred to as "glue code" may be written and compiled to create, and/or be interpreted as, an executable interface that logically couples one application programming interface (API) with another API. In some cases, this glue code itself may constitute an API that logically couples two or more other APIs. As another example, source code may be written and compiled to create, and/or interpreted as, an executable interface that migrates data between different types of databases. Creating interfacing source code manually may require expertise and/or experience with each of the computing components being logically coupled. In the context of large scale data and/or source code migrations, manually creating interfacing source code, especially from scratch, may be exceedingly time consuming, labor-intensive, and/or error prone.

SUMMARY

Implementations are described herein for generating interfacing source code between computing components based on input other than manually writing (and debugging) computer code from scratch, such as via natural language input, visual demonstrations, mathematical operators/operations/transformations, etc. These techniques enable experts and non-experts alike to quickly generate interfacing source code that they can edit if desired, and/or that can be compiled and/or interpreted as an executable interface to facilitate logical coupling between disparate computing components. As used herein, "computing component" may refer to an executable software application, source code that can be compiled into, and/or interpreted as, an executable software application, various types of APIs (e.g., operating system APIs, remote APIs, Web APIs, etc.), a software library and/or framework, a database management system, or any other computing component built using computer-executable instructions.

In some implementations, a method may be implemented using one or more processors and may include: processing a natural language input to generate an interface request semantic embedding, wherein the natural language input requests generation of interfacing source code to logically couple a first computing component with a second computing component; processing the interface request semantic embedding based on a first domain model associated with the first computing component to generate a first pool of candidate code snippets for logically coupling with the first computing component; processing the interface request semantic embedding based on a second domain model associated with the second computing component to generate a second pool of candidate code snippets for logically coupling with the second computing component; generating a plurality of candidate instances of interfacing source code between the first and second computing components, wherein each candidate software interface comprises a different permutation of candidate code snippets from the first and second pools of candidate code snippets; and causing output to be rendered by a computing device, wherein the output conveys one or more of the candidate instances of interfacing source code to a user.

In various implementations, the method may include selecting, for inclusion in the output, a given candidate software interface of the plurality of candidate instances of interfacing source code based on one or more criteria. In various implementations, the one or more criteria may include a measure of similarity between the given candidate software interface and the natural language input. In various implementations, the measure of similarity may correspond to a distance between the interface request semantic embedding and interfacing source code semantic embedding generated from the given candidate software interface.

In various implementations, the output may solicit feedback from the user about the one or more conveyed candidate instances of interfacing source code, and the method may further include: receiving user input that includes feedback; and training the first or second domain model based on the feedback.

In various implementations, the first computing component may include a first application programming interface (API) and the second computing component comprises a second API, and wherein the software interface includes one or more logical couplings between one or more functions of the first API and one or more functions of the second API. In various implementations, the first computing component may include a first database management system and the second computing component comprises a second database management system.

In various implementations, the method may further include eliminating one or more of the plurality of candidate instances of interfacing source code from consideration for inclusion in the output. In various implementations, the one or more eliminated candidate instances of interfacing source code may fail to parse or compile. In various implementations, the one or more eliminated candidate instances of interfacing source code may fail to satisfy a logical goal associated with the natural language input.

In a related aspect, a method implemented using one or more processors may include: processing a natural language input to generate one or more interface request semantic embeddings, wherein the natural language input requests generation of interfacing source code to logically couple multiple computing components together; processing the one or more interface request semantic embeddings based on one or more domain models associated with the multiple computing components to generate one or more pools of candidate code snippets for logically coupling the multiple computing components together; generating a plurality of candidate instances of interfacing source code between the multiple computing components, wherein each candidate software interface comprises a different permutation of candidate code snippets from the one or more pools of candidate code snippets; and causing output to be rendered by a computing device, wherein the output conveys one or more of the candidate instances of interfacing source code to a user.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In some implementations, to practice selected aspects of the present disclosure, a person (who in the present context may also be referred to as a "user") may provide input other than compilable computer code—such as a typed or spoken natural language statement, a visual demonstration, pseudocode, a code snippet in a different language, a mathematical formula or demonstration, a numeric example, etc. —that sets forth how the person wishes to logically couple two or more computing components. The input may be analyzed, e.g., using one or more "domain models," to select and/or logically couple one or more elements of one of the computing components with one or more elements of another of the computing components. As used herein, a "logical coupling" refers to a snippet or fragment of source code (or more generally, domain-specific language or "DSL") that logically couples an element (e.g., a function call, stub, variable, etc.) of one computing component with an element of another computing component. In some implementations, different permutations of logical couplings may be assembled as a plurality of candidate instances of interfacing source code.

In various implementations, the candidate instances of interfacing source code may be simulated, e.g., via compilation, interpretation, and/or execution, to eliminate candidate instances of interfacing source code that do not compile (e.g., have syntactic errors) or function properly. One or more of the remaining candidate instances of interfacing source code (or simulations generated therefrom) may then be presented to the user. This allows the user to provide feedback for downstream domain model training and/or to make use of (e.g., after modifying) the candidate instances of interfacing source code, e.g., by compiling and/or interpreting the candidate instances of interfacing source code, at which point it may be referred to as an "executable interface," to exchange data between the computing components.

In some implementations, the user-provided input may first be parsed and processed to identify one or more domains associated with the request—e.g., domains of computing components identified in the user-provided input. As used herein, a "domain" may refer to a targeted subject area in which a computing component is intended to apply, e.g., a sphere of knowledge, influence, and/or activity around which the computing component's logic revolves. In some implementations, keywords in the user-provided input may be heuristically matched to domain keywords. In other implementations, the user-provided input may be processed, e.g., based on a natural language processing (NLP) model such as a transformer network, various types of recurrent neural networks, etc., to generate a semantic embedding that represents the natural language input. In some implementations, this natural language input semantic embedding may be used to identify one or more domains, e.g., based on distance(s) in embedding space between the semantic embedding and other embeddings associated with various domains.

In various implementations, one or more domain models may have been generated previously for each domain. For instance, one or more machine learning models—such as a recurrent neural network (RNN), transformer network, various types of neural networks, a reinforcement learning policy, etc. —may be trained based on a corpus of source code and/or documentation associated with the domain. As a result of this training, one or more of the domain model(s) may be usable to process what will be referred to herein as an "interface request semantic embedding" to generate a pool of candidate source code snippets that may be incorporated into one or more candidate instances of interfacing source code. In some implementations, the interface request semantic embedding may be the same as the natural language input semantic embedding mentioned above. However, in other implementations, the interface request semantic embedding may be far richer semantically, e.g., not only encoded with the natural language input (or whatever other type of input provided by the user), but also encoded with additional contextual information and/or domain knowledge.

Source code snippets (or "fragments") may take various forms, such as fully-composed or template-based source code snippets that are available to facilitate logical coupling with (e.g., access to) element(s) of a computing component. As an example, one available code snippet may be code that calls a function (element of computing component) of an API (the computing component). As another example, an available code snippet may be code that causes a database management system (computing component) to run a database query (element of computing component) that retrieves, alters, or deletes data/relationships between data. As yet another example, an available code snippet may be wrapper code that facilitates incorporation of some inner code fragment into a larger source code file.

Once a pool of candidate code snippets is generated for each "active" domain (e.g., the domains of the computing components being logically coupled), a plurality of candidate instances of interfacing source code may be generated. Each candidate instance of interfacing source code may include a different permutation of candidate code snippets drawn from the pool of candidate source code snippets generated for each active domain. As used herein, a "candidate instance of interfacing source code" may include, for instance, an API (e.g., that couples other APIs), glue code, wrapper code, one or more stubs, a shell script, etc.

In some implementations, one or more of the plurality of candidate instances of interfacing source code may be eliminated or filtered from consideration for being presented to a user. For example, a candidate instance of interfacing source code may include syntactic error(s) that prevents it from compiling, and consequently, it may be eliminated. Or even if a candidate instance of interfacing source code successfully compiles, the resulting candidate executable interface may not be aligned with (e.g., may not achieve) a logical goal provided by the user in the natural language input (e.g., generates erroneous or undesired outcome).

In various implementations, one or more of the remaining candidate instances of interfacing source code may be conveyed to the user as output, e.g., visually within a source code editor and/or an integrated development environment (IDE). The user may then have the opportunity to edit, approve/reject, and/or select one or more candidate instances of interfacing source code (if multiple are available), e.g., for use in logically coupling two or more computing components. In some implementations, the candidate instances of interfacing source code may be filtered further prior to being presented to the user. For example, an "interfacing source code semantic embedding" may be generated, e.g., using a NLP model such as an RNN or transformer network, from each remaining candidate software interface. These interfacing source code semantic embeddings may be compared to the interface request semantic embedding, e.g., using techniques such as cosine similarity, dot product, etc. One or more of the most similar (e.g., closest in embedding space) remaining candidate software interfaces may be selected for presentation to the user, and the others may be eliminated or dropped.

Figure 1:
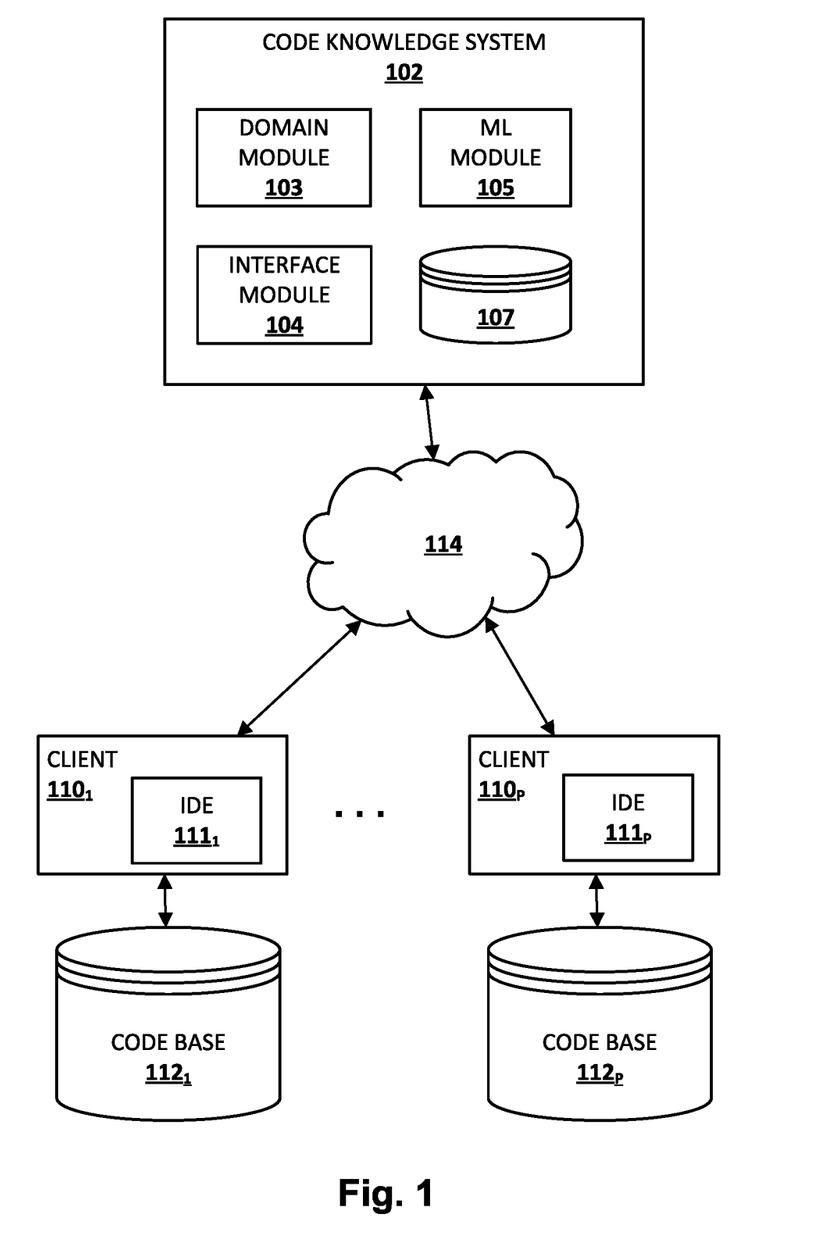
FIG. 1 is a diagram of an example environment in which implementations disclosed herein may be implemented.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be operably coupled with clients 1101-$p$ via one or more computer networks (114) to help clients 1101-$p$ manage their respective code bases 1121-$p$. In other implementations, code knowledge system 102 may be implemented locally at a client 110. Code knowledge system 102 may include, among other things, a domain module 103 and an interface module 104 that are configured to perform selected aspects of the present disclosure in order to help one or more clients 1101-$p$ to logically couple different computing components within and/or across code bases 1121-$p$.

Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

In some implementations, each client 110 may include an integrated development environment (IDE) 111 that can be used to edit/write source code. In other implementations, other applications may be used to edit source code, such as a simple text editor, a word processing application, a source code editor application with specific functionality to aid in computer programming, etc. Whether a programmer uses a standalone source code editor application or a source code editor module of an IDE 111, in many cases, the source code the programmer sees may be visually annotated, e.g., with different tokens being rendered in different colors to facilitate ease of reading. In some implementations, the source code editor may include extra functionality specifically designed to ease programming tasks, such as tools for automating various programming tasks, a compiler, real time syntax checking, etc. In some implementations, techniques described herein may enhance aspects of this extra functionality provided by a source code editor (whether a standalone application or part of an IDE), e.g., by generating and/or recommending interfacing source code for logically coupling computing components such as APIs, databases, etc.

In various implementations, code knowledge system 102 may include a machine learning ("ML" in FIG. 1) module 105 that has access to data indicative of various domain/ machine learning models/policies in a database 107. These trained domain/machine learning models/policies may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network ("RNN", e.g., long short-term memory, or "LSTM", gate recurrent units, or "GRU", etc.), a BERT (Bidirectional Encoder Representations from Transformers) transformer network, a reinforcement learning policy, and any other type of machine learning model that may be applied to facilitate selected aspects of the present disclosure. ML module 105 may process various data based on these machine learning models at the request or command of other components, such as domain module 103 and/or interface module 104.

Domain module 103 may be configured to identify one or more domains that are relevant to a natural language input provided by a user, e.g., via IDE 111. For instance, a request to logically couple two computing components may be processed by domain module 103 to identify two domains, one for each of the two computing components. As one example, if a user requests that records from a first type of database are migrated to a second type of database, then domain module 103 may identify the domain of the first type of database and the domain of the second type of database. If the user were to request generation of a library in a particular programming language to logically couple the two different databases, then domain module 103 may also identify, as a third active domain, a domain of the particular programming language. In some implementations, domain module 103 may cause ML module 105 to process the user's natural language input using a domain classifier machine learning model in database 107. The output generated therefrom may be indicative of (e.g., include probabilities associated with) one or more domains that are relevant to the user's natural language input.

In some implementations, domain module 103 may also be configured to retrieve domain knowledge from a variety of different sources associated with an identified domain. In some such implementations, this retrieved domain knowledge (and/or an embedding generated therefrom) may be provided to downstream component(s), e.g., in addition to the natural language input or an encoding thereof. This additional domain knowledge may allow downstream component(s), particularly machine learning models, to make predictions (e.g., generating interfacing source code) that is more likely to be satisfactory. In some implementations, the additional domain knowledge may be retrieved from a source such as a search engine. For example, if a user's natural language input includes "convert VAR_A in the first domain to VAR_B in the second domain using linear algebra," the additional domain knowledge may include the text from the top n (positive integer) search results returned from the search "What is linear algebra"? By encoding this additional text into a semantic embedding that also encodes the user's natural language input, the semantic embedding may be more likely to generate positive outcomes downstream, e.g., in the form of interfacing source code that is aligned more closely with the user's intent.

Interface module 104 may be configured to generate and/or assemble interfacing source code for logically coupling computing components from different domains identified by domain module 103. For example, in some implementations, interface module 104 may process one or more interface request semantic embeddings based on one or more domain models (also referred to herein as "domain-specific language encoders") to generate one or more pools of candidate code snippets for logically coupling multiple computing components together. Interface module 104 may then generate a plurality of candidate instances of interfacing source code between the multiple computing components. Each candidate software interface may include a different permutation of candidate code snippets from the one or more pools of candidate code snippets. Interface module 104 may then cause output to be rendered by a computing device. The output may convey one or more of the candidate instances of interfacing source code to a user, e.g., for purposes of user feedback, editing the interface, etc. Non-limiting examples of how domain module 103 and interface module 104 may operate are described with respect to FIGS. 2 and 3, Referring now to FIG. 2, in various implementations, a "concept arena" 220 and a "neural arena" 222 may be provided for processing a user-provided input provided by a user 218 that seeks to logically couple two or more computing components. In examples described herein and depicted in the figures, the user-provided input takes the form of a natural language input 226, but this is not meant to be limiting. User-provided input may take other forms, such as pseudocode, visual data (e.g., drawings, schematic diagrams, graphs, etc.), desired output, mathematical demonstrations of how data should be transformed between domains, etc.

Figure 2:
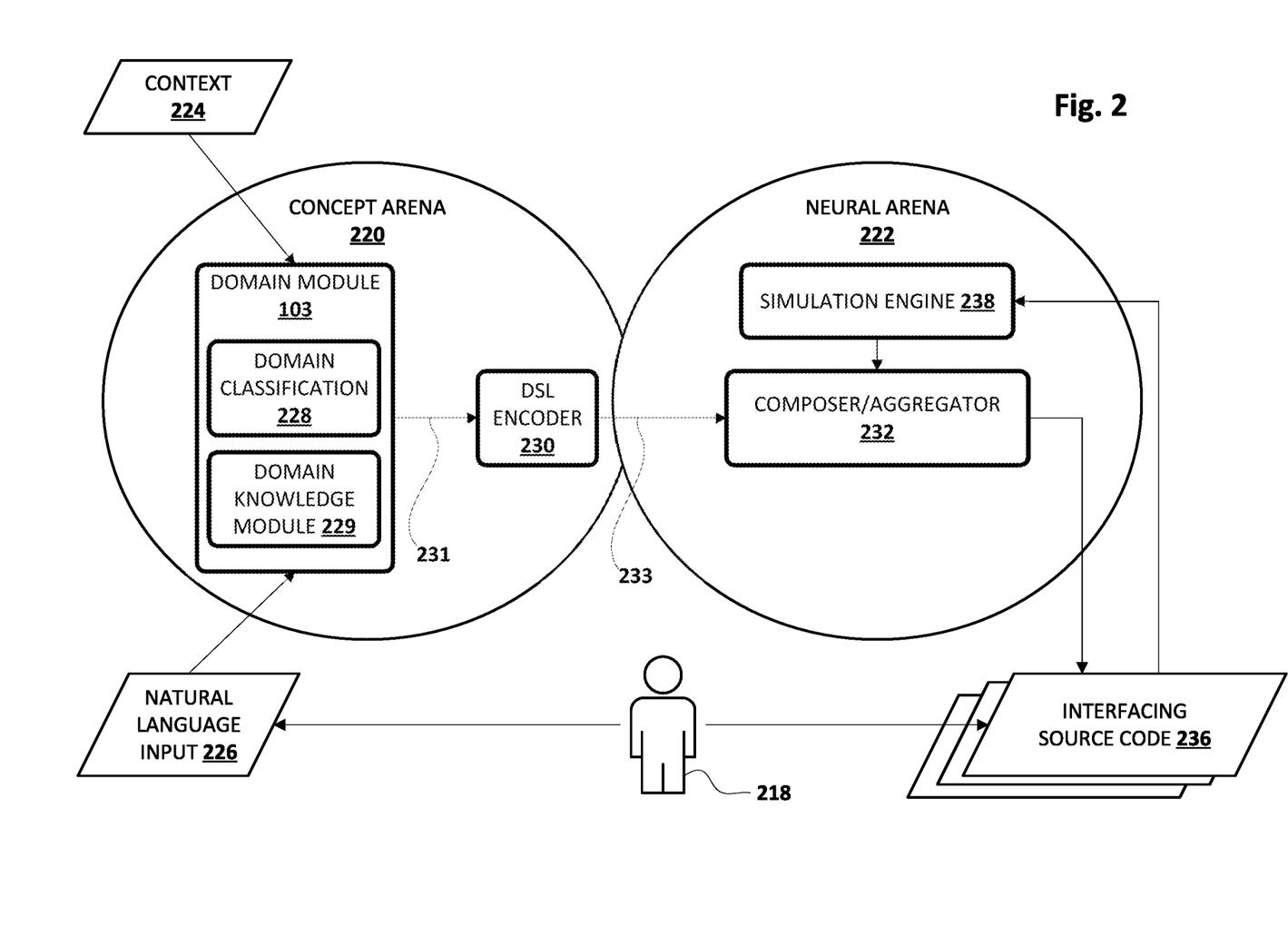
FIG. 2 schematically illustrates an example of how data may be processed to generate interfacing source code, in accordance with various implementations.

Beginning in concept arena 220, context information 224 and the user's natural language input 226 may be processed by domain module 103, e.g., based on a domain classification model 228, to identify one or more domains relevant to the user's request. Context information 224 may include, for instance, one or more source code files currently being edited by the user (e.g., opened in the user's IDE 111 in FIG. 1), the user's credentials, other information about the user (e.g., department, role, title, location, etc.), information about a high-level task (e.g., logically coupling two or more APIs, migrating data between different database management systems, etc.), etc. For instance, open source code files, and in particular, the programming language in which the source code is being written, may identify a domain in which user 218 is programming. In some implementations, context information 224 may narrow the search space of potentially-applicable domains, e.g., to those to which the user has access, or which form part of a particular code base.

In some implementations, based on the domain(s) identified by domain module 103, a domain knowledge module 229 may retrieve domain-specific knowledge. This domain-specific knowledge may be used, e.g., in combination with natural language input 226 and/or context 224, to generate an interface request semantic embedding 231. As noted above, in some implementations, domain-specific knowledge may include documents returned using one or more search engine searches. Additionally or alternatively, in some implementations, domain-specific knowledge may include information retrieved from other sources, such as definitive textbooks about a particular domain (e.g., a programming language textbook or treatise), technical documentation, and so forth. In some implementations, a machine learning model such as a transformer may be applied to context 224, natural language input 226, and domain-specific knowledge (if retrieved) to generate an interface request semantic embedding 231 that is rich semantically.

One or more domain-specific language (DSL) encoders 230 that correspond to the identified domain(s) may then process the interface request semantic embedding 231 to generate one or more respective pools 233 of candidate source code snippets (alternatively, "code snippets." "code fragments") for logically coupling with the computing component(s) associated with the active domain(s). DSL encoder 230 may use various forms of machine learning models to generate these pools 233 of candidate source code snippets. In some implementations, a finite action space of code snippets (each code snippet corresponding to an action) that are usable to generate interfacing source code may be predefined, e.g., as a subset of a larger programming language. DSL encoder 230 may process interface request semantic embedding 231 to generate, for instance, probabilities associated with each code snippet in the finite action space. In some implementations, DSL encoder 230 may select, as a pool of candidate code snippets, those code snippets with probabilities that exceed some threshold. In some implementations, multiple different finite action spaces may be available, e.g., for multiple different programming languages (e.g., Python, C, C++, Java, JavaScript, Perl, etc.). If the user identifies (e.g., in natural language input 226) a particular programming language they would like to use to create interfacing source code, the corresponding finite action space may be used to generate a pool of candidate code snippets.

In various implementations, various permutations of the pool(s) 233 of candidate code snippet(s) may be assembled, e.g., by a composer/aggregator 232, into respective instances of interfacing source code. In some implementations, composer/aggregator 232 may assemble these permutations using one or more machine learning models. For example, a neural network may be used to process different permutations of the candidate source code snippets. Composer/aggregator 232 may randomly select these permutations, or it may apply a policy that generates likelihood scores for each snippet and stochastically select code snippets based on those likelihood scores. The neural network that is used to process these different permutations may be trained, e.g., using a corpus of functioning source code, to generate a quality score of each permutation of source code snippets. Those permutations of candidate source code snippets with quality scores that exceed some threshold may be passed downstream as candidate instances of interfacing source code 236 for additional analysis. In other implementations, composer/aggregator 232 may apply a reinforcement learning to select code snippets from the pools for assembly into a candidate instance of interfacing source code 236. Thus, in various implementations, each candidate instance of interfacing source code 236 may include a different permutation of the candidate source code snippets selected and assembled by composer/aggregator 232.

In some implementations, these candidate instances of interfacing source code 236 may be analyzed by a simulation engine 238. Simulation engine 238 may be configured to perform a variety of different actions to determine whether the candidate instances of interfacing source code(s) satisfy various criteria, e.g., which are indicative of whether the candidate instances of interfacing source code(s) are worthy of being presented to user 218. As indicated by the arrow back to composer/aggregator 232, in some implementations, simulation engine 238 may provide feedback to composer/aggregator 232 that enables the latter to, for instance, generate new candidate instances of interfacing source code. For example, simulation engine 238 may attempt to compile the multiple candidate instances of interfacing source code 236. Those candidate instances of interfacing source code 236 that do not compile, e.g., due to syntactical errors, logical errors, system errors, parsing errors, etc., may be eliminated from consideration. Other candidate instances of interfacing source code 236 may successfully compile into executable interfaces. However, some of those executable interfaces may (e.g., when executed) fail to satisfy a logical goal associated with natural language input 226, and hence, may be eliminated as well.

In some implementations, simulation engine 238 may rank the remaining candidate instances of interfacing source code 236 based on their similarity to natural language input 226 and/or interface request semantic embedding 231. For example, a measure of similarity may be determined between each given candidate software interface 236 and interface request semantic embedding 231. In some such implementations, the measure of similarity may correspond to a distance in embedding space between interface request semantic embedding 231 and an interfacing source code semantic embedding generated from the given candidate software interface 236. In some implementations, one or more of the top-ranked remaining candidate instances of interfacing source code 236 may be presented to user 218, e.g., as options for logically coupling with the software component associated with the active domain. In some implementations, multiple simulation engines 238 may be operated, each testing various aspects of interfacing source code at various levels of abstraction. An example of this will be explained with reference to FIG. 3.

In some implementations, the training process 234 may include ongoing training. As an example, those instances in which candidate instances of interfacing source code 236 did not compile—or in which they compiled but yielded executable interfaces that were not aligned with a logical goal stated in natural language input 226—may be used as negative training examples (or at least may be used as "neutral" training examples for which no reward was granted). Similarly, those candidate instances of interfacing source code 236 that compiled and were ranked highly enough to be presented to user 218—and especially if the user provides positive feedback—may be used as positive training examples. For example, an end reward may be distributed among multiple iterations of a reinforcement learning policy applied by composer/aggregator 232. Positive feedback from user 218 may include, for instance, user 218 using the candidate instances of interfacing source code 236 to logically couple the two or more computing components, with few or now edits. On the other hand, if user 218 heavily edits even the most highly-ranked candidate instances of interfacing source code before compiling them for use, the reward may be decreased.

Figure 3:
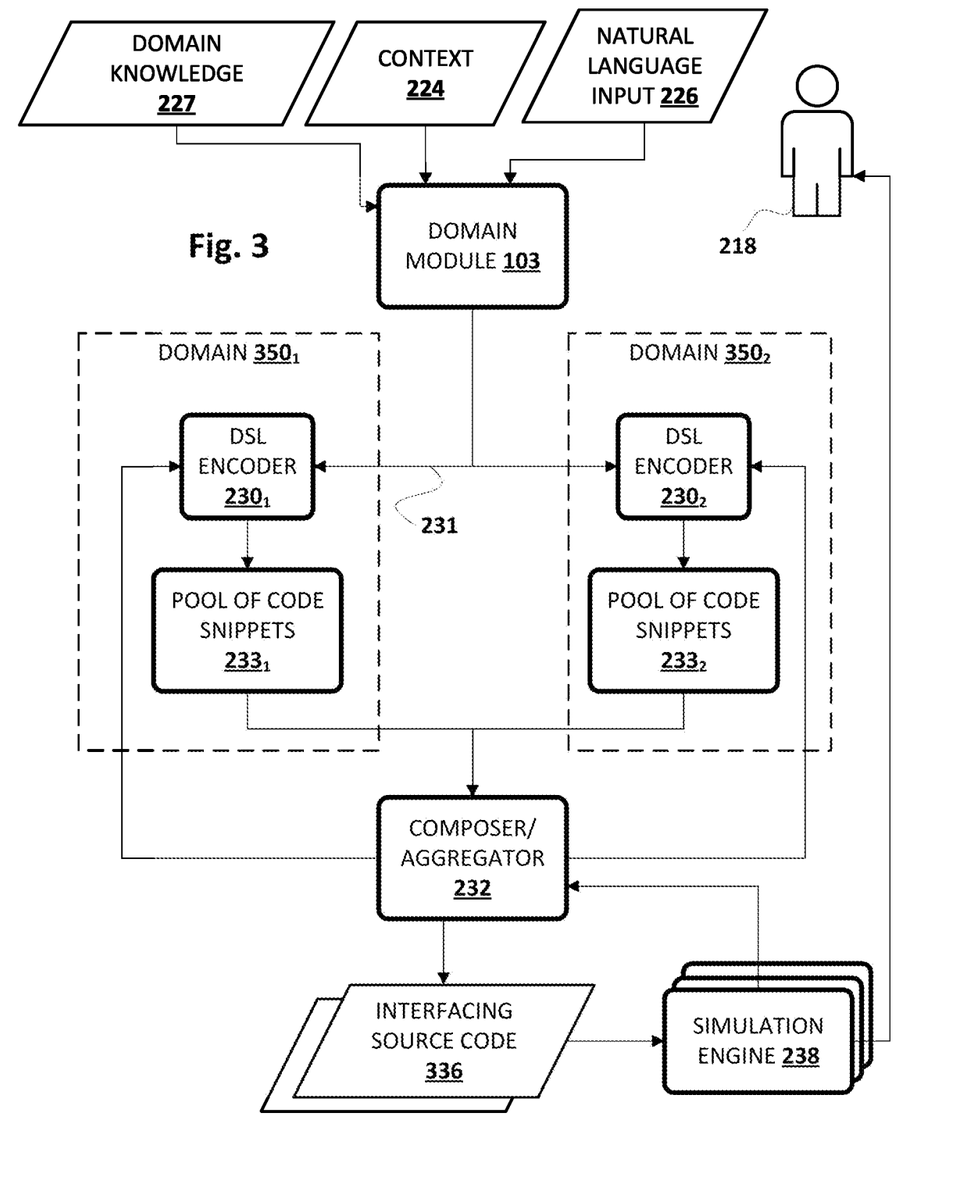
FIG. 3 schematically illustrates another example of how data may be processed to generate interfacing source code, in accordance with various implementations.

FIG. 3 schematically depicts how context 224 and natural language input 226 provided by a user 218 may be processed by various components configured with selected aspects of the present disclosure to generate a candidate instance of interfacing source code 336. The process depicted schematically in FIG. 3 shares many aspects with that depicted in FIG. 2.

Domain module 103 may process context 224 and natural language input 226, e.g., using domain classification model 228, to identify two or more domains $350_1$, $350_2$. In other implementations, domain module 103 may identify domains using other means, such as heuristically (e.g., via keywords). While two domains $350_1$, $350_2$ are depicted in FIG. 3, it should be understood that more than two domains may be identified and processed using techniques described herein. For example, a user could request that a library be generated in a first programming language that is meant to connect a first API in a second programming language to a second API in a third programming language. Three domains may be activated in response to such a request: a first domain associated with the first programming language, a second domain associated with the first API, and a third domain associated with the second API.

In some implementations, domain module 103 may generate interface request semantic embedding 231. As noted previously, interface request semantic embedding 231 may encode context 224, natural language input 226, and/or additional domain-specific knowledge 227 retrieved by domain knowledge module 229 (see FIG. 2). Within domains $350_{1-2}$, respective DSL encoders $230_{1-2}$ may process interface request semantic embedding 231 to generate respective pools $233_{1-2}$ of candidate source code snippets drawn, for instance, from a finite action space defined for a particular programming language in which the interfacing source code is to be written (which may default to a particular finite action space/programming language if the user does not request a particular programming language). Composer/aggregator 232 may then assemble various permutations of candidate source code snippets drawn from pools $233_{1-2}$ to generate candidate instances of interfacing source code 336.

As described previously, these candidate instances of interfacing source code 336 may be processed by simulation engine 238, e.g., to eliminate those that do not compile or that yield executable interfaces that are out-of-alignment with logical goal(s) stated in natural language input 226. In addition, candidate instances of interfacing source code 336 that are not sufficiently similar (e.g., in embedding space) to interface request semantic embedding 231 may also be eliminated. One or more of any remaining candidate instances of interfacing source code 336 may then be presented to user 218, e.g., for purposes of providing feedback.

In some implementations, multiple simulation engines 238 may be operated to evaluate aspects of candidate instances of interfacing source code 336 at multiple levels of abstraction. As indicated by the arrow in FIG. 3, the outcomes of these simulations may be used, e.g., by composer/aggregator 232, to eliminate, rank, or otherwise evaluate candidate instances of interfacing source code, to further train one or more machine learning models that composer/aggregator 232 relies upon, and so forth.

As an example, in some implementations, context 224, natural language input 226, and domain knowledge 227 may be used to generate a starting state, an intermediate state, and an end state, respectively. The starting state may be an embedding or other representation of, for instance, one or more of the computing components to be logically coupled, as they exist prior to being logically coupled. The intermediate state may be an embedding or other representation of, for instance, candidate instance(s) of interfacing source code 336 that are assembled/composed by composer/aggregator 232 based on context 224, natural language input 226, and/or domain knowledge 227. The end state may be an embedding or other representation that is generated, for instance, based on output generated by one or more of the computing components once the interfacing source code is implemented.

In some implementations, one or more of these states may be compared to the interface semantic request embedding 231, which itself may semantically represent a goal of the user. For example, if the user's input largely conveys details about the desired interfacing source code, then the intermediate state(s) generated from candidate instances of interfacing source code 336 may represent the best comparison to interface request semantic embedding 231. If the user's input largely conveys details about the desired goal of creating the interfacing source code (e.g., the user provides example output), then the end state(s) generated from candidate instances of interfacing source code 336 may represent the best comparison to interface request semantic embedding 231.

Techniques described herein may be applicable in any number of scenarios in which two or more computing components are logically coupled. In some cases, one of the computing components may not necessarily exist, and instead may be generated as a result of the interfacing source code. For example, suppose a user issues a request to convert a SQL database to a JSON-based database. The user may make a natural language statement such as "Please generate a JSON database based on XYZ SQL database," or the user may provide other input, such as an exemplary JSON-formatted database table, and request that the SQL database be converted to this format.

In either case, techniques described herein may be implemented to identify the two domains, JSON and SQL, and to generate respective pools $233_{1-2}$ of candidate source code snippets for each of these domains, as described previously. Different permutations of these candidate source code snippets may be assembled into candidate instances of interfacing source code 336. One or more simulation engines 238 may simulate and/or test various components involved in this process, such as the original SQL database (e.g., by generating starting state embedding(s)), the candidate instance(s) of interfacing source code (e.g., intermediate state embeddings), and/or the output created by the candidate instance(s) of interfacing source code (e.g., the end states). In this particular example, the end state embedding generated from a JSON database that results from a particular candidate instance of interfacing source code 336 may be compared, for instance, to the interface request semantic embedding 231. The greater the similarity, the more likely the candidate instance of interfacing source code 336 is satisfactory, or at least worthy of being presented to the user.

As another example scenario in which disclosed techniques would be applicable, assume that in a given country experiencing a pandemic, there is a "supply" system that may be, for instance, an inventory management database system for various components, such as vaccines, treatment drugs, hospital beds, oxygen tanks, ventilators, medical personnel, etc. Assume further that there is also a "demand" system, such as a hospital system, that represents demand for these supplies, and which runs its own database system that may be different from that of the supply system. Each of these systems may provide one or more APIs that allow access to inventory, demand-related information, etc.

In order to more accurately and/or quickly match supply and demand, these two systems may be logically coupled using an API that is generated using techniques described herein. In particular, a user may provide input that causes generation of interfacing source code that causes available supplies to be automatically directed to places that demand them. For example, if a particular hospital's intensive care unit (ICU) is near capacity, demand for ICU beds from the demand system may be redirected to other hospitals with available ICU beds, which may be ranked based on, for instance, their distances to the locations where the ICU beds are most needed. As another example, demand trends may be monitored over time, and the interfacing source code may suggest or automatically order supplies to be stocked in advance, e.g., at those locations most likely to need the supplies. These decisions may or may not be presented to people first, e.g., so that medical personnel can approve or deny the reallocation of resources.

Simulation engine 238 may also be used to adjust the interfacing source code based on circumstances, such as changes in supply and/or demand. For example, simulation engine 238 may be able to observe the mechanisms of both the supply system and the demand system. Consequently, simulation engine 238 may be able to simulate and/or interplay numerous supply-demand scenarios, e.g., to determine how realistic those scenarios are. As a result, supply-demand scenarios can be fulfilled even in potentially unseen scenarios.

There are numerous other scenarios in which techniques described herein may be leveraged to automatically generate interfacing source code. As one example, a new piece of complex hardware, such as a 3D printer, may be added to a manufacturing line. The 3D printer and the manufacturing line may each have their own domain. Techniques described herein may be used to generate interfacing source code that logical couples the 3D printer's API with one or more APIs of the manufacturing line.

As more examples, a process such as employee tracking that has been historically performed using a spreadsheet may be transitioned to being performed using a more complex database system. Techniques described herein may facilitate generation of interfacing source code to migrate the data from the spreadsheet to the new database system. A cryptocurrency portfolio management system may be logically coupled with a traditional asset management pricing and valuation system using interfacing source code generated in accordance with the present disclosure. An email list server may be logically coupled with customer/client management database (CRM) using interfacing source code generated as described herein. A unified messaging system may be created as interfacing source code that logical couples any number of different messaging applications. An online banking system may be logically coupled with investment portfolio account(s) for management of cash flow and/or projections. Any number of additional scenarios are contemplated.

Figure 4:
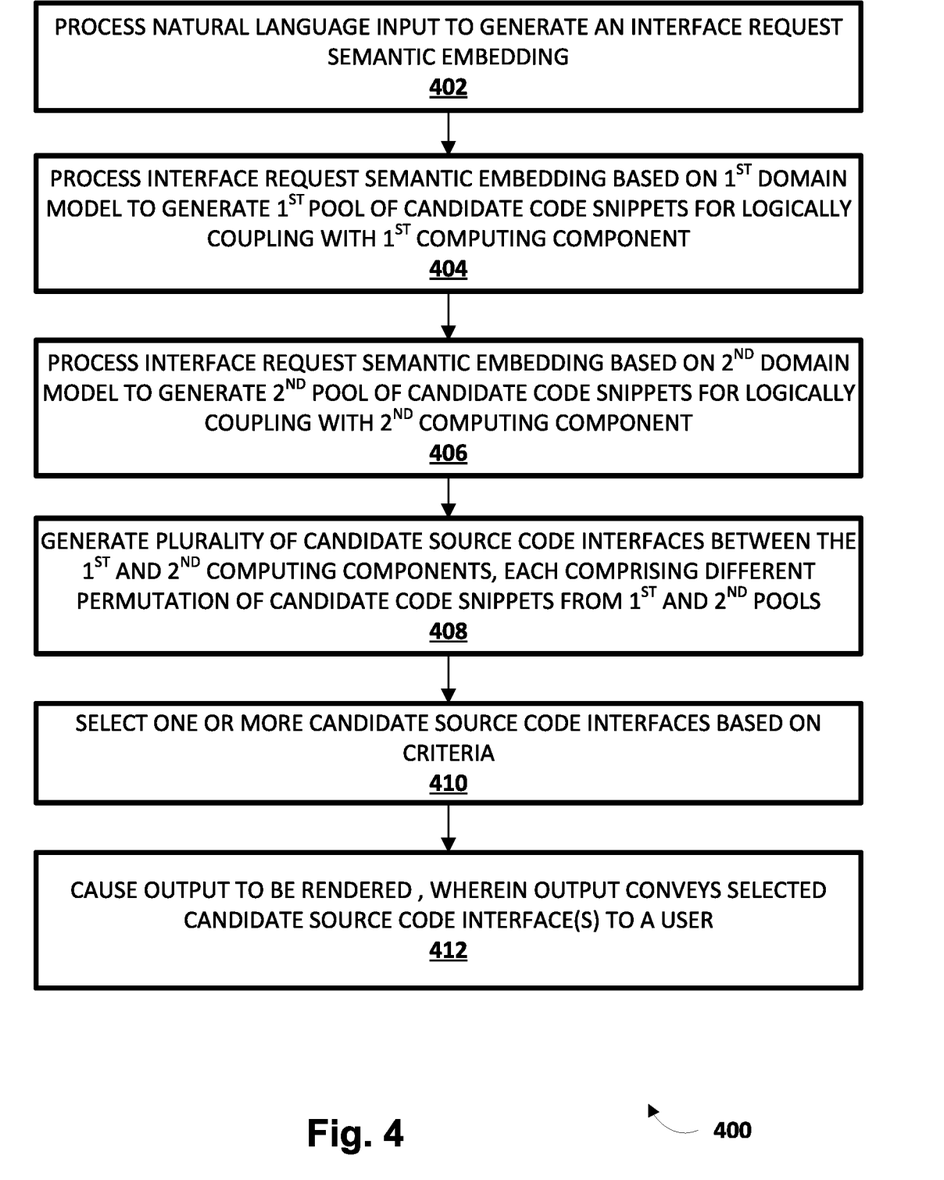
FIG. 4 is a flowchart illustrating an example method of practicing selected aspects of the present disclosure, according to implementations disclosed herein.

FIG. 4 is a flowchart illustrating an example method 400 for practicing selected aspects of the present disclosure, according to implementations disclosed herein. For convenience, the operations of the flow chart are described with reference to a system that performs the operations. This system may include various components of various computer systems, such as one or more components of code knowledge system 102. Moreover, while operations of method 400 are shown in a particular order, this is not meant to be limiting. One or more operations may be reordered, omitted or added.

At block 402, the system may process a natural language input (e.g., 226), alone or in conjunction with context data 224, to generate an interface request semantic embedding (e.g., 231). In various implementations, the natural language input requests generation of interfacing source code to logically couple a first computing component with a second computing component. In some implementations, the natural language input may be used, e.g., by domain module 103 in conjunction with other data (e.g., context 224), to first identify one or more domains relevant to the natural language input. Once the domain(s) are identified, domain knowledge module 229 may retrieve domain-specific knowledge (e.g., 227) that can be used alone with the natural language input (e.g., 226) and the contextual information (e.g., 224) to generate the interface request semantic embedding (e.g., 231).

At block 404, the system may process the interface request semantic embedding based on a first domain model (e.g., first DSL encoder $230_1$) associated with the first computing component to generate a first pool (e.g., $233_1$) of candidate code snippets for logically coupling with the first computing component. Similarly, at block 406, the system, e.g., by way of ML module 105, may process the interface request semantic embedding based on a second domain model (e.g., second DSL encoder $230_2$) associated with the second computing component to generate a second pool (e.g., $233_2$) of candidate code snippets for logically coupling with the second computing component.

At block 408, the system, e.g., by way of interface module 104, may generate a plurality of candidate instances of interfacing source code (e.g., 236, 336) between the first and second computing components. Each candidate instance of interfacing source code (e.g., 236, 336) may include a different permutation of candidate code snippets selected (e.g., randomly, stochastically, pursuant to a reinforcement learning policy, etc.) from the first and second pools of candidate code snippets.

At block 410, the system, e.g., by way of interface module 104, may select one or more candidate instances of interfacing source code based on various criteria. As noted previously, these criteria may include, but are not limited to, ability to parse and/or compile, alignment of resultant executable interface with logical goal stated in the natural language input, similarity between a candidate instance of interfacing source code and the natural language output (e.g., in embedding space), and so forth.

At block 412, the system may cause output to be rendered by a computing device. This output may convey one or more of the candidate instances of interfacing source code to a user. Suppose a user is editing a C++ source code file in an IDE (e.g., 111) and requests logical coupling between the working source code and a particular API. A candidate instance of interfacing source code may take the form of, for instance, line(s) of C++ code that are suggested to the user within the IDE. The user can accept the lines of code as is, reject them, or even accept them then edit them.

Figure 5:
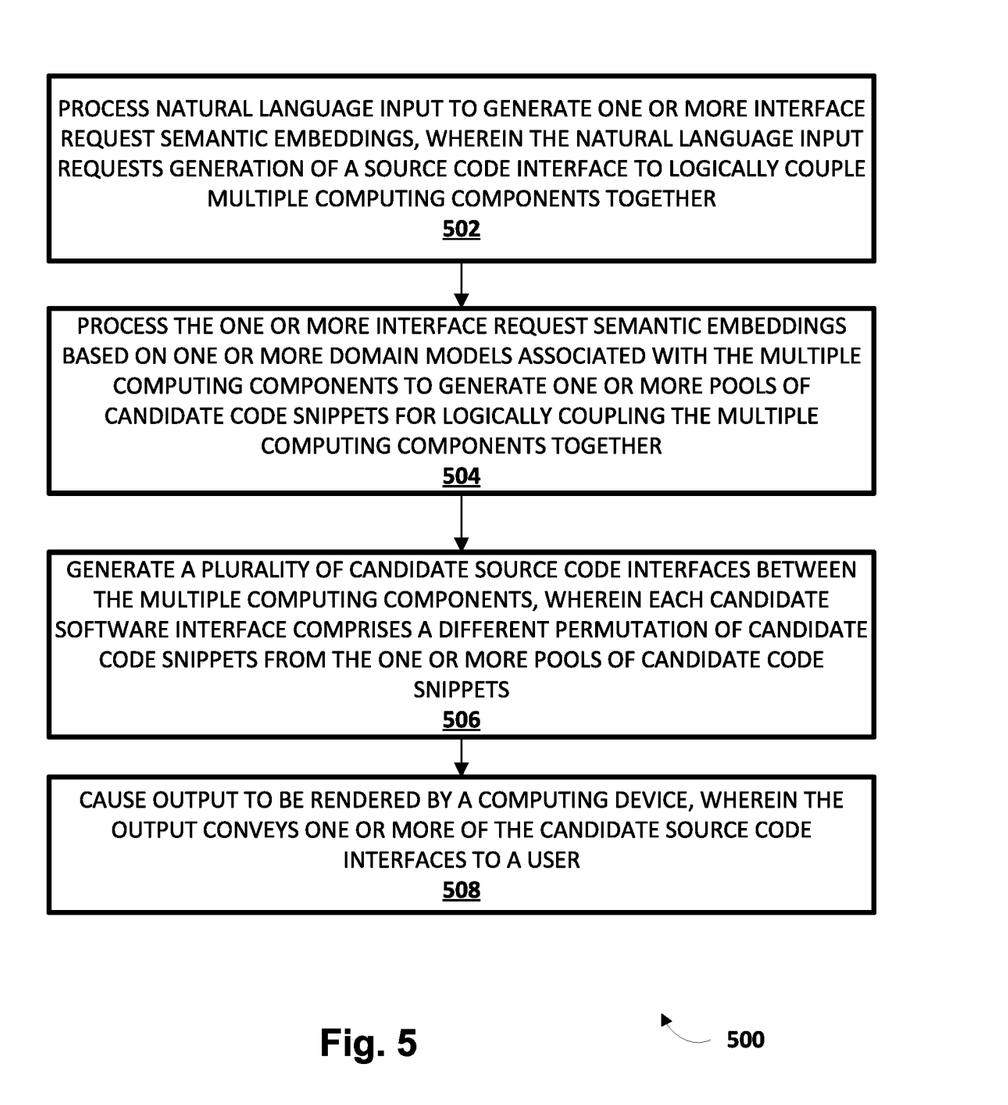
FIG. 5 is a flowchart illustrating an example method of practicing selected aspects of the present disclosure, according to implementations disclosed herein.

FIG. 5 is a flowchart illustrating an example method 500 for practicing selected aspects of the present disclosure, according to implementations disclosed herein. Method 500 represents a variation of method 400. For convenience, the operations of the flow chart are described with reference to a system that performs the operations. This system may include various components of various computer systems, such as one or more components of code knowledge system 102. Moreover, while operations of method 500 are shown in a particular order, this is not meant to be limiting. One or more operations may be reordered, omitted or added.

At block 502, the system may process a natural language input (e.g., 226) to generate one or more interface request semantic embeddings. In some cases, context (e.g., 224) and/or domain-specific knowledge (e.g., 227) may also be used to generate the interface request semantic embedding(s). Similar to the case in FIG. 4, the natural language input may request generation of interfacing source code to logically couple multiple computing components together. These multiple computing components may include not only the two different computing components that are being logically coupled, but the interfacing source code itself, particularly if it is intended to be written in a programming language that differs from the programming languages associated with the other computing components to be logically coupled. For example, a user may request generation of a library in Python that logically couples a JavaScript Object Notation (JSON) interface with a structured query language (SQL) database. In such an example, three computing components (or more generally, three domains) may be activated: JSON, SQL, and Python.

At block 504, the system may process the one or more interface request semantic embeddings based on one or more domain models (e.g., DSLs $230_{1-2}$) associated with the multiple computing components to generate one or more pools (e.g., $233_{1-2}$) of candidate code snippets for logically coupling the multiple computing components together. In some implementations, these domain models may take the form of, for instance, neural networks, reinforcement learning policies, etc.

At block 506, the system may generate a plurality of candidate instances of interfacing source code between the multiple computing components. Each candidate instance of interfacing source code may once again include a different permutation of candidate code snippets from the one or more pools of candidate code snippets. At block 508, similar to block 412 of FIG. 4, the system may cause output to be rendered by a computing device, wherein the output conveys one or more of the candidate instances of interfacing source code to a user. While not depicted in FIG. 5, operations similar to those performed in association with the selection of block 410 in FIG. 4 may also be performed to filter the candidate instances of interfacing source code generated at block 506.

Figure 6:
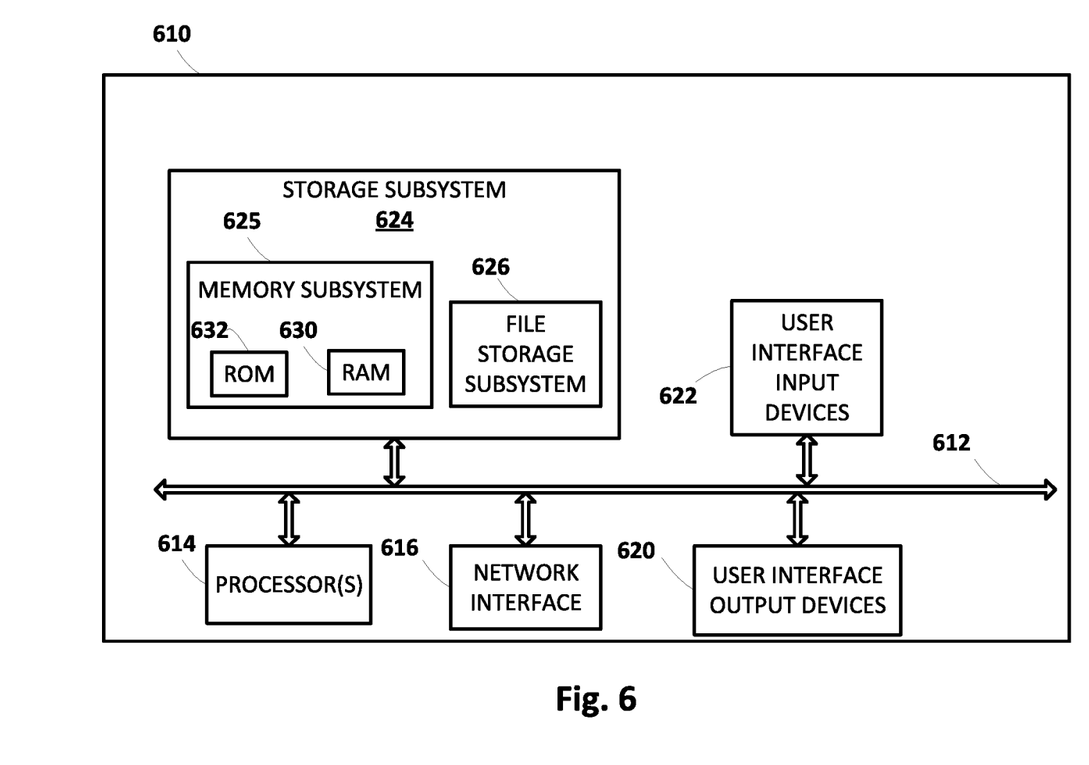
FIG. 6 illustrates an example architecture of a computing device.

FIG. 6 is a block diagram of an example computing device 610 that may optionally be utilized to perform one or more aspects of techniques described herein. In some implementations, one or more of the client computing devices $106_{1-N}$, privacy status system 120, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods 400 and 500 of FIGS. 4 and 5.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   processing a natural language input to generate an interface request semantic embedding, wherein the natural language input requests generation of interfacing source code to logically couple a first computing component associated with a first domain with a second computing component associated with a second domain;
   processing the interface request semantic embedding using one or more transformer networks to generate, for inclusion in a first pool, candidate code snippets for logically coupling with the first computing component, wherein one or more of the transformer networks are trained based on a first corpus of source code associated with the first domain;
   processing the interface request semantic embedding using one or more of the transformer networks to generate, for inclusion in a second pool, candidate code snippets for logically coupling with the second computing component, wherein one or more of the transformer networks are trained based on a second corpus of source code associated with the second domain;
   generating a plurality of candidate instances of interfacing source code between the first and second computing components, wherein each candidate software interface comprises a different permutation of candidate code snippets from the first and second pools of candidate code snippets; and
   causing output to be rendered by a computing device, wherein the output conveys one or more of the candidate instances of interfacing source code to a user.

2. The method of claim 1, further comprising selecting, for inclusion in the output, a given candidate software interface of the plurality of candidate instances of interfacing source code based on one or more criteria.

3. The method of claim 2, wherein the one or more criteria include a measure of similarity between the given candidate software interface and the natural language input.

4. The method of claim 3, wherein the measure of similarity corresponds to a distance between the interface request semantic embedding and interfacing source code semantic embedding generated from the given candidate software interface.

5. The method of claim 1, wherein the output solicits feedback from the user about the one or more conveyed candidate instances of interfacing source code, and the method further comprises:
receiving user input that includes feedback; and
training one or more of the transformer networks based on the feedback.

6. The method of claim 1, wherein the first computing component comprises a first application programming interface (API) and the second computing component comprises a second API, and wherein the software interface includes one or more logical couplings between one or more functions of the first API and one or more functions of the second API.

7. The method of claim 1, wherein the first computing component comprises a first database management system and the second computing component comprises a second database management system.

8. The method of claim 1, further comprising eliminating one or more of the plurality of candidate instances of interfacing source code from consideration for inclusion in the output.

9. The method of claim 8, wherein the one or more eliminated candidate instances of interfacing source code fail to parse or compile.

10. The method of claim 8, wherein the one or more eliminated candidate instances of interfacing source code fail to satisfy a logical goal associated with the natural language input.

11. A method implemented using one or more processors, comprising:
processing a natural language input to generate one or more interface request semantic embeddings, wherein the natural language input requests generation of interfacing source code to logically couple multiple computing components associated with multiple different domains;
processing the one or more interface request semantic embeddings based on one or more transformer networks associated with the multiple computing components to generate, for inclusion in one or more pools, candidate code snippets for logically coupling the multiple computing components together, wherein one or more of the transformer networks are trained based on corpuses of documents associated with the multiple domains;
generating a plurality of candidate instances of interfacing source code between the multiple computing components, wherein each candidate software interface comprises a different permutation of candidate code snippets from the one or more pools of candidate code snippets; and
causing output to be rendered by a computing device, wherein the output conveys one or more of the candidate instances of interfacing source code to a user.

12. A system comprising one or more processors and memory storing instructions that, in response to execution of the instructions by the one or more processors, cause the one or more processors to:
process a natural language input to generate an interface request semantic embedding, wherein the natural language input requests generation of interfacing source code to logically couple a first computing component associated with a first domain with a second computing component associated with a second domain;
process the interface request semantic embedding using one or more transformer networks to generate, for inclusion in a first pool, candidate code snippets for logically coupling with the first computing component, wherein one or more of the transformer networks are trained based on a first corpus of source code associated with the first domain;
process the interface request semantic embedding using one or more of the transformer networks to generate, for inclusion in a second pool, candidate code snippets for logically coupling with the second computing component, wherein one or more of the transformer networks are trained based on a second corpus of source code associated with the second domain;
generate a plurality of candidate instances of interfacing source code between the first and second computing components, wherein each candidate software interface comprises a different permutation of candidate code snippets from the first and second pools of candidate code snippets; and
cause output to be rendered by a computing device, wherein the output conveys one or more of the candidate instances of interfacing source code to a user.

13. The system of claim 12, further comprising instructions to select, for inclusion in the output, a given candidate software interface of the plurality of candidate instances of interfacing source code based on one or more criteria.

14. The system of claim 13, wherein the one or more criteria include a measure of similarity between the given candidate software interface and the natural language input.

15. The system of claim 14, wherein the measure of similarity corresponds to a distance between the interface request semantic embedding and interfacing source code semantic embedding generated from the given candidate software interface.

16. The system of claim 12, wherein the output solicits feedback from the user about the one or more conveyed candidate instances of interfacing source code, and the system further comprises instructions to:
receive user input that includes feedback; and
train the first or second transformer network based on the feedback.

17. The system of claim 12, wherein the first computing component comprises a first application programming interface (API) and the second computing component comprises a second API, and wherein the software interface includes one or more logical couplings between one or more functions of the first API and one or more functions of the second API.

18. The system of claim 12, wherein the first computing component comprises a first database management system and the second computing component comprises a second database management system.

19. The system of claim 12, further comprising instructions to eliminate one or more of the plurality of candidate instances of interfacing source code from consideration for inclusion in the output.

20. The system of claim 19, wherein the one or more eliminated candidate instances of interfacing source code fail to parse or compile.

* * * * *